UNITED STATES PATENT OFFICE.

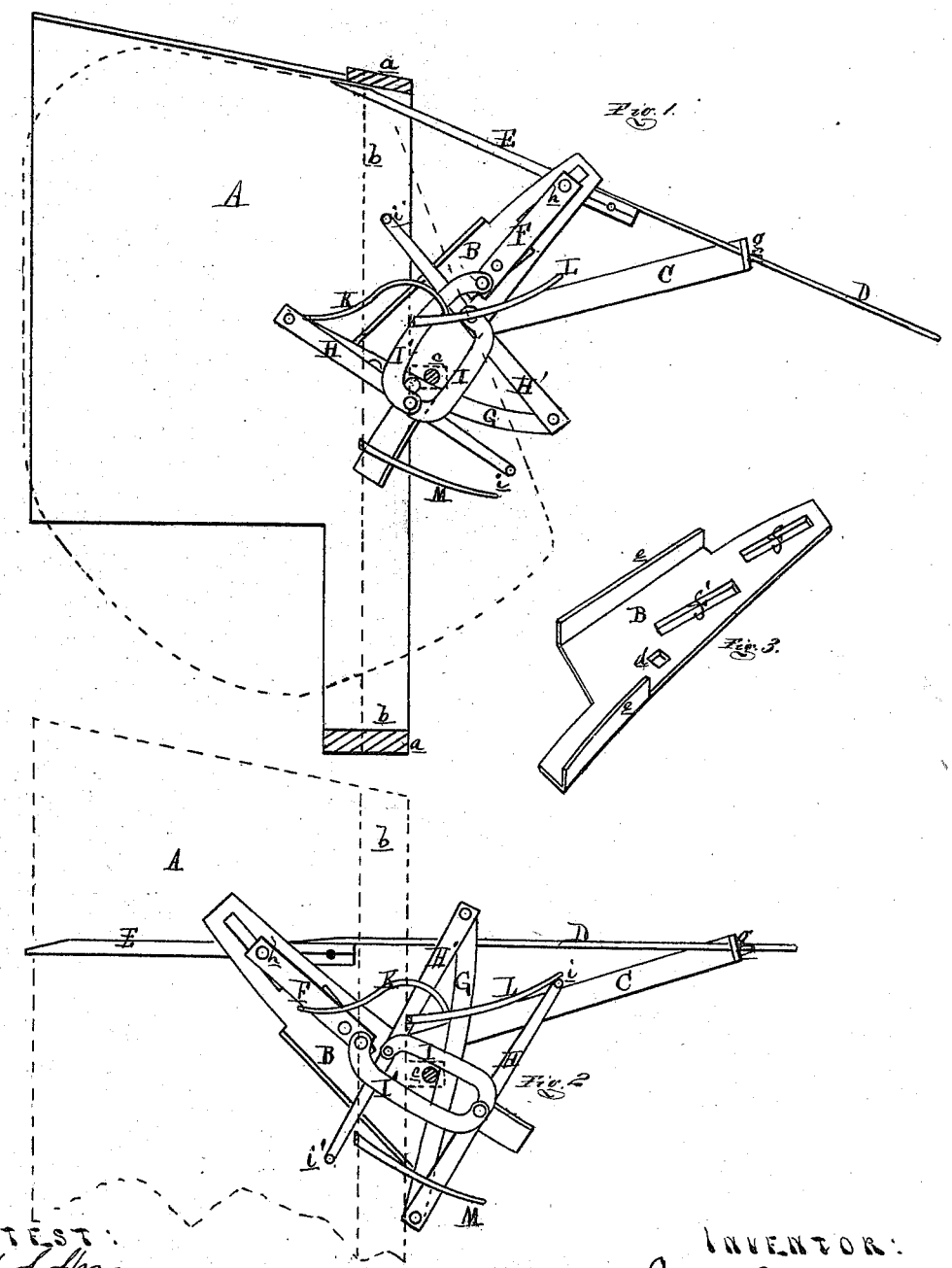

JOSEPH K. AUGSPURGER, OF TRENTON, OHIO.

IMPROVEMENT IN HARVESTER-RAKES.

Specification forming part of Letters Patent No. 142,139, dated August 26, 1873; application filed April 2, 1873.

*To all whom it may concern:*

Be it known that I, JOSEPH K. AUGSPURGER, of Trenton, in the county of Butler and State of Ohio, have invented a new and useful Improvement in Harvester-Rakes; and I do declare that the following is a true and accurate description thereof, reference being had to the accompanying drawings and to the letters of reference marked thereon, and being a part of this specification, in which—

Figure 1 is a plan of a harvester-platform with my improved rake attachment, showing the position of the rake when it has commenced to advance toward the front of the platform preparatory to sweeping it, the course of the point or front end of the rake being shown in the dotted line. Fig. 2 is a plan, showing the position of the several parts when the rake has swept one-third of the platform. Fig. 3 is a perspective view of the slotted crank.

This invention has for its object to provide a harvester with a raking attachment which will, as often as may be required, sweep the grain from the platform, delivering it at the side; and to this end the inventon consists in a vertical shaft journaled in bearings on the side of an elevated girt spanning the back edge of the platform and rotated from any convenient part of the harvester-gearing. To the lower or pendent end of this shaft is secured a slotted crank-plate actuating a series of links and levers, which, in connection with three cams on the girt, impart a peculiar movement to a rake upon the platform, in the manner more fully hereinafter described.

In the drawing, A represents the platform of a harvester, at the rear corners of which the posts *a a* are erected, connected by the girt *b*, shown in dotted lines. In bearings at the rear side of the girt a vertical shaft, *c*, is journaled, and is driven by any convenient means from some rotating part of the harvester-gearing. To the lower or pendent end of this shaft a slotted crank-plate, B, is secured, the lower end of the shaft being squared to pass through the opening *d*, Fig. 3, in said crank, which is secured therein by a nut or key. The edges or sides of the crank-plate are turned upward or flanged, as at *e e*, and in the longer arm there are two diagonal slots, *f f'*. A long bracket, C, extends back from the rear end of the platform, terminating in a standard, *g*, with an eye in its upper end, through which plays a rod, D, to the front end of which the rake E is secured, and which rests upon the platform. A pin, *h*, near the heel of the rake, extends up through the slot *f* in the crank, and also through a plate or bar, F, lying thereon. A pin, *h'*, in said bar extends down through the slot *f'*, so that the bar is compelled to move longitudinally and be guided by the pins in their movements in the said slots. A diagonal bar, G, is rigidly secured to the crank-plate just back of the shaft, and to one end is pivoted one end of a lever, H, whose other end is turned up to form a wrist, *i*, while to the other end of the bar G a similar lever, H', is in like manner pivoted, its outer end being also turned up to form a wrist, *i'*. A curved link, I, passing around the shaft, connects the levers H H' together about midway of their length. Another link, I', pivoted to the center pin of the lever H, connects it with the heel of the bar F, which, at the other end, is pivoted to the heel of the rake. The levers H H' rest and slide upon the flanges *e e* of the crank-plate. K is a curved cam-rod projecting forward from the girt and back under it at the right side of the shaft, looking at the platform from the rear. L is a cam-bar projecting to the rear from the girt, to the right from the shaft, and is curved to the right, as shown. M is a similar cam-bar pendent from the front edge of the girt, passing under it to the rear, and is also curved to the left, as shown.

The wrists *i i'* impinge upon the cam-bars K L M, successively, upon their convex sides, and are carried to their extremities before becoming tangent thereto in the rotation of the crank-plate. This impinging of the wrists upon the cams produces a longitudinal movement of the rake-pin *h* in its slot *f*, while at the same time the rod at the rear end of the rake is describing a series of oscillatory movements through the eye of its support, which will be readily understood on reference to the drawing without necessitating a lengthy description. The combination of movements causes the point of the rake to sweep in the irregular outline shown by the dotted outline in Fig. 1 at each revolution of the crank-plate, in which it sweeps over the side of the platform the grain that has fallen thereon.

What I claim as my invention, and desire to secure by Letters Patent, is—

The construction and arrangement of the shaft $c$, slotted crank-plate B, the diagonal bar G secured thereto, the levers H H', wrists $i$ $i'$, cams K L M, the bracket C, standard $g$, rod D, rake E, with its pin $h$ projecting through the slot $f$ of the crank-plate, and pivoting it to the bar F, and the links I I', with relation to the girt $b$ and platform A, substantially as and for the purpose set forth.

JOSEPH K. AUGSPURGER.

Witnesses:
 AUGUSTUS ECKERT,
 R. G. LANDIS.